June 10, 1952   M. A. STICELBER   2,600,281
SHEETED DOUGH TRANSFER CONVEYER
Filed Sept. 7, 1948   8 Sheets-Sheet 1

Fig. 1.

INVENTOR.
MERLIN A. STICELBER
BY
Alfred R. Fuchs
ATTORNEY

June 10, 1952　　　M. A. STICELBER　　　2,600,281
SHEETED DOUGH TRANSFER CONVEYER
Filed Sept. 7, 1948　　　　　　　　　　　　8 Sheets-Sheet 2

Fig. 2.

*INVENTOR.*
MERLIN A. STICELBER
BY
*Alfred R. Fuchs*
ATTORNEY

June 10, 1952 M. A. STICELBER 2,600,281
SHEETED DOUGH TRANSFER CONVEYER
Filed Sept. 7, 1948 8 Sheets-Sheet 3

Fig. 3.

INVENTOR.
MERLIN A. STICELBER
BY
Alfred R. Fuchs
ATTORNEY

June 10, 1952 M. A. STICELBER 2,600,281
SHEETED DOUGH TRANSFER CONVEYER
Filed Sept. 7, 1948 8 Sheets-Sheet 4

INVENTOR.
MERLIN A. STICELBER
BY Alfred R. Fuchs
ATTORNEY

INVENTOR.
MERLIN A. STICELBER
BY
Alfred R. Fuchs
ATTORNEY

Patented June 10, 1952

2,600,281

UNITED STATES PATENT OFFICE 2,600,281

SHEETED DOUGH TRANSFER CONVEYER

Merlin A. Sticelber, Kansas City, Mo., assignor to Stickelber & Sons, Inc., a corporation of Missouri Application September 7, 1948, Serial No. 48,042

11 Claims. (Cl. 198—84)

My invention relates to sheeting mechanism for dough molding machines, and more particularly to means for sheeting pieces of dough as a step in forming or molding a loaf of bread.

It is a particular purpose of my invention to provide a sheeting mechanism for loaf molding machines that is provided with means for either reverse sheeting the dough or for straight sheeting thereof, dependent upon the adjustment of the machine. This is accomplished by providing suitable conveying means for pieces of dough in combination with means for arresting the movement of the pieces of dough and deflecting the same downwardly onto conveying means moving in the opposite direction so as to reverse the piece of sheeted dough so that the end that was forwardmost will be rearmost when traveling along the second conveying means, and to provide means for varying the speed of the first conveying means so that when said conveying means is operating at high speed the dough piece will be reversed in the manner referred to, whereas if the conveying means is run at a relatively slow speed the dough piece will not engage the arresting and deflecting means, but instead will pass around the discharge end of the conveying means in such a manner that the end that was forwardmost on said first conveying means will also be forwardmost on the second conveying means when traveling along thereon.

The rollers used in my sheeting mechanism for dough molding machines are of the general character described, shown and claimed in my co-pending application Serial No. 793,359, on Dough Sheeting Apparatus and Method, filed December 23, 1947. As pointed out therein, I have found out that dough, no matter how sticky, will not stick to rollers of certain plastic materials or rollers that have a dough contacting surface made of certain plastic materials. These plastic materials are synthetic resins, and the particular class of synthetic resins that have been found to act in this manner are polymers of tetrafluoroethylene. The specific material that I have found particularly adaptable for this purpose is a polytetrafluoroethylene polymer, which has no true melting point, but undergoes a solid-phase transition at 620° F., but at the temperatures at which it is used in sheeting dough the strength of the material is not impaired and the material is not affected in any manner by the dough, nor does it have any effect on the dough that engages the same, except that the dough will absolutely not stick thereto. This material will not absorb water, is substantially impermeable to moisture and does not undergo any detectable change even when exposed to weathering.

More specifically my invention comprises dough sheeting means comprising a pair of rollers that are made in such a manner that the surfaces thereof that contact the dough are of the above referred to synthetic resin that has the non-sticking properties and with which dough piece guiding means cooperate to feed the dough pieces first into engagement with said rollers and then from said rollers to a conveyor belt, which carries the dough pieces one at a time to a deflecting device, into engagement with which the dough pieces are projected from the discharge end of the conveyor belt, when operating at high speed, to deposit the pieces of dough flatly on a conveyor belt operating in the opposite direction and below said first mentioned conveyor belt and to provide means for feeding the dough pieces from said last mentioned conveyor belt into a pair of rollers similar to the first pair of rollers from which said dough piece is fed to a second pair of rollers, means being provided for guiding the dough pieces from the first set of rollers to a second set of rollers located below said first set, and further to provide means for guiding the dough pieces from said lower set of rollers to a conveyor belt that carries the dough pieces to suitable curling mechanism, all said guiding means for dough pieces being of such a character that the same do not engage with any of the rollers so that no frictional heat will be created, as would be the case if scrapers engaged with said rollers.

By the operation of the upper of the belt conveying means above referred to at high speed, the dough piece is caused to travel back in the opposite direction, from that in which it passed along the first or upper conveyor belt, as it passes along the lower conveyor belt, and thus the edge that was leading along the upper conveyor belt will be trailing along the lower conveyor belt, then the lower sheeting rollers will sheet the piece of dough reversely from that in which it was sheeted by the upper set of rollers. However, by adjusting the machine so as to operate the upper conveyor belt at a much lower speed, approximately half that of the high speed operation thereof, the dough pieces will not be projected against the deflecting means at the discharge end of the conveyor, but will follow the conveyor belt around the roller at its discharge end and thus turn over as the pieces are transferred from the one conveyor belt to the other, but the leading edge on the lower conveyor belt will be the same as it was on the upper conveyor belt, and accordingly the sheeting action performed by the lower sets of rollers will be in the same direction as the first set of rollers, which is commonly referred to as straight sheeting.

Specifically my invention comprises a pair of conveyor belts, one arranged above the other and operating in opposite directions, the upper conveyor belt receiving sheeted pieces of dough and the speed of said upper conveyor belt being variable so as to either reverse the piece of dough as it is transferred from the upper to the lower conveyor belt, so that it is moving with what had been the trailing edge forward along said lower conveyor belt, or so that said piece of dough is not reversed in being transferred from the upper conveyor belt to the lower conveyor belt.

It is a further purpose of my invention to provide an adjustable deflector member for producing the above referred to reversing action, so that said deflecting means can be located in such a manner that the dough pieces discharged from the upper conveyor belt will properly engage therewith to cause said dough pieces to be arrested in their forward movement in the direction in which the same had been projected by said upper conveyor belt and deflected downwardly to the lower conveyor belt.

Thus in my dough molding machine all of the advantages of reverse sheeting can be obtained, which are principally that there will be no dry forward end edge on the dough piece which end edge would be in the center of the loaf when the dough is curled up on itself, and which causes development of holes and white spots in the baked loaf, but instead the moisture will be squeezed to the surface of the dough piece so as to provide moisture at the surface of the rear or sealing end edge of the piece when it is sealed or rolled up as well as at the forward end edge. Also the advantage of not using excessive amounts of dusting flour exists, and in addition to that the temperature of the piece of dough is not materially raised during the sheeting operation, because the sheeting rollers are not heated up, as is the case when scrapers engage the same, as has been customary before my improved plastic surfaced rollers were developed.

Other objects and advantages of my invention will appear as the description of the drawings proceeds. I desire to have it understood, however, that I do not intend to limit myself to the particular details shown or described, except as defined in the claims.

Referring in detail to the drawings, my improved sheeting mechanism for dough molding machines comprises a housing having side walls 20 and 21 and end walls 22 and 23. The side walls have reduced upper ends providing offsets 24 therein. An inclined wall portion 26 extends upwardly from the end wall 23 to the top of the side walls 20 and 21 and there is a top wall 27 that extends to a feed opening 28 in the top of the machine, said feed opening being located between the top edge of the inclined wall 26 and the depending flange 25 on the top wall 27. The entire machine is, preferably, mounted portably, casters 29 being provided on the bottom flanges 30 of the housing for this purpose.

Rounded dough pieces are fed through the opening 28 into the machine and a hopper is provided aligning with the opening 28, said hopper having vertical side walls 31 having outwardly flared upper end portions 31' and downwardly converging end walls 32 and 33, the end wall 32 having a vertical lip portion 34 that extends downwardly between the flanges 35 on the flanged roller 36. The hopper has laterally extending walls 19 extending to the side walls 20 and 21 and is mounted between said side walls by means of depending flanges 17 and headed fastening elements 18, reinforcing ribs 37 extending between said side walls 20 and 21 and the side walls 31 of the hopper. A downwardly tapering hopper 38 is thus provided, which feeds the dough pieces between the roller 36 that has the flanges 35 and the roller 39, which cooperates therewith to sheet dough, or in other words, to roll out the rounded pieces of dough into a sheet-like form.

The roller 36 has a metal body portion 40 mounted on the shaft 41 to rotate therewith and has an outer tubular or sleeve-like portion 42 of a synthetic resin that has the property that dough will not stick thereto fixed on the metal core 40 so as to rotate with said metal core. A ply 43 of said synthetic resin also overlies each of the flanges 35 on the inner face thereof with which dough will contact. The roller 39 also has a metal body portion 44 fixed on the shaft 45 and an outer cylindrical or tubular ply 46 of the synthetic resin having the above referred to property. The hopper side walls 31 are cut away on an arc 47 so as to clear the outer periphery of the ply 43 of the flanges 35 and are in alignment with said flange portions of the roller 36. The inclined wall 33 is cut away to provide an opening at 48, through which the roller 39 projects. The rollers 36 and 39 rotate in the directions indicated by the arrows thereon and the roller 39 is adjustable toward and away from the roller 36 in a manner to be described below.

The bottom edge of the wall 33 and the bottom edge of the lip 34 are spaced sufficiently from the surface of the rollers 39 and 36 that there will be no frictional contact between the surface of said rollers and the hopper walls.

Figures 4, 10:
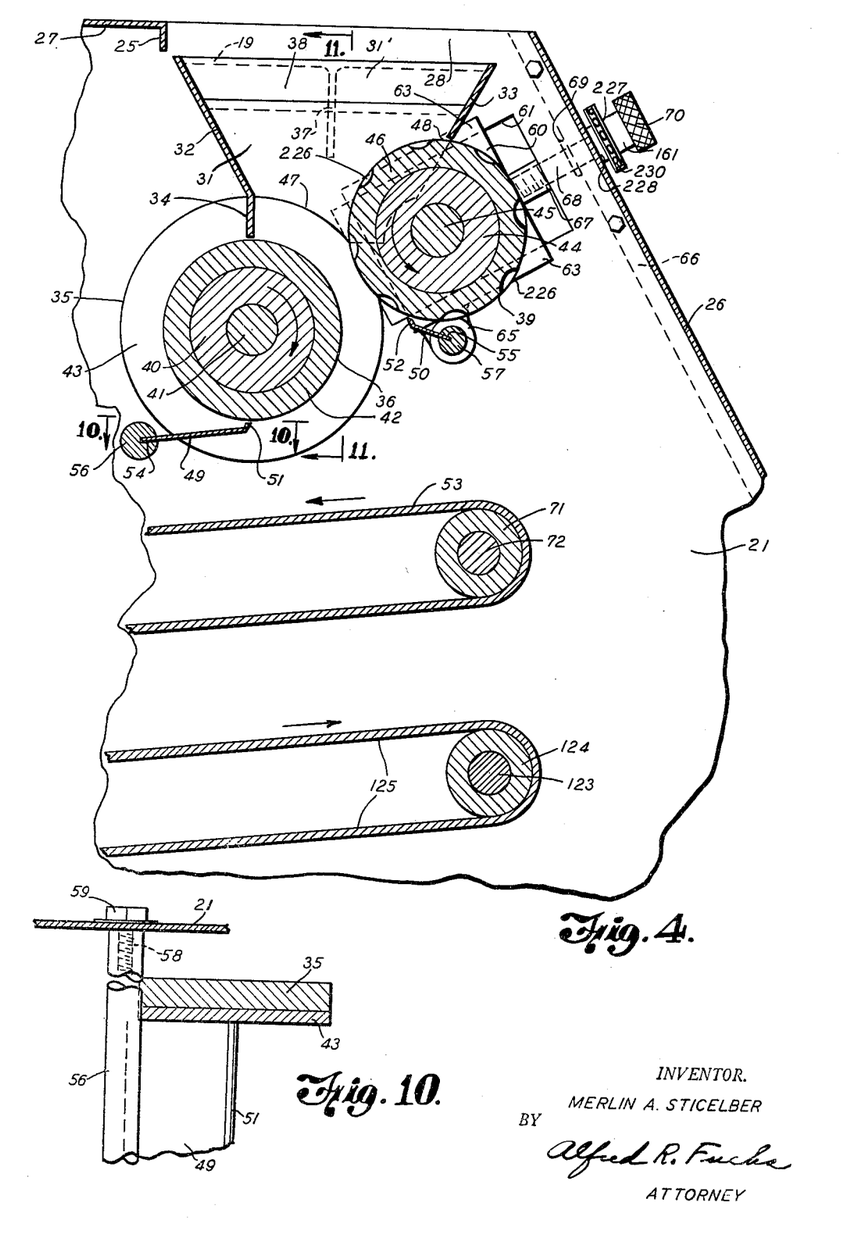
Fig. 4 is a fragmentary vertical sectional view through the first set of sheeting rollers and portions of the conveying apparatus cooperating therewith, on an enlarged scale.
Fig. 10 is a fragmentary section taken on the line 10—10 of Fig. 4.
Figures 6, 7:
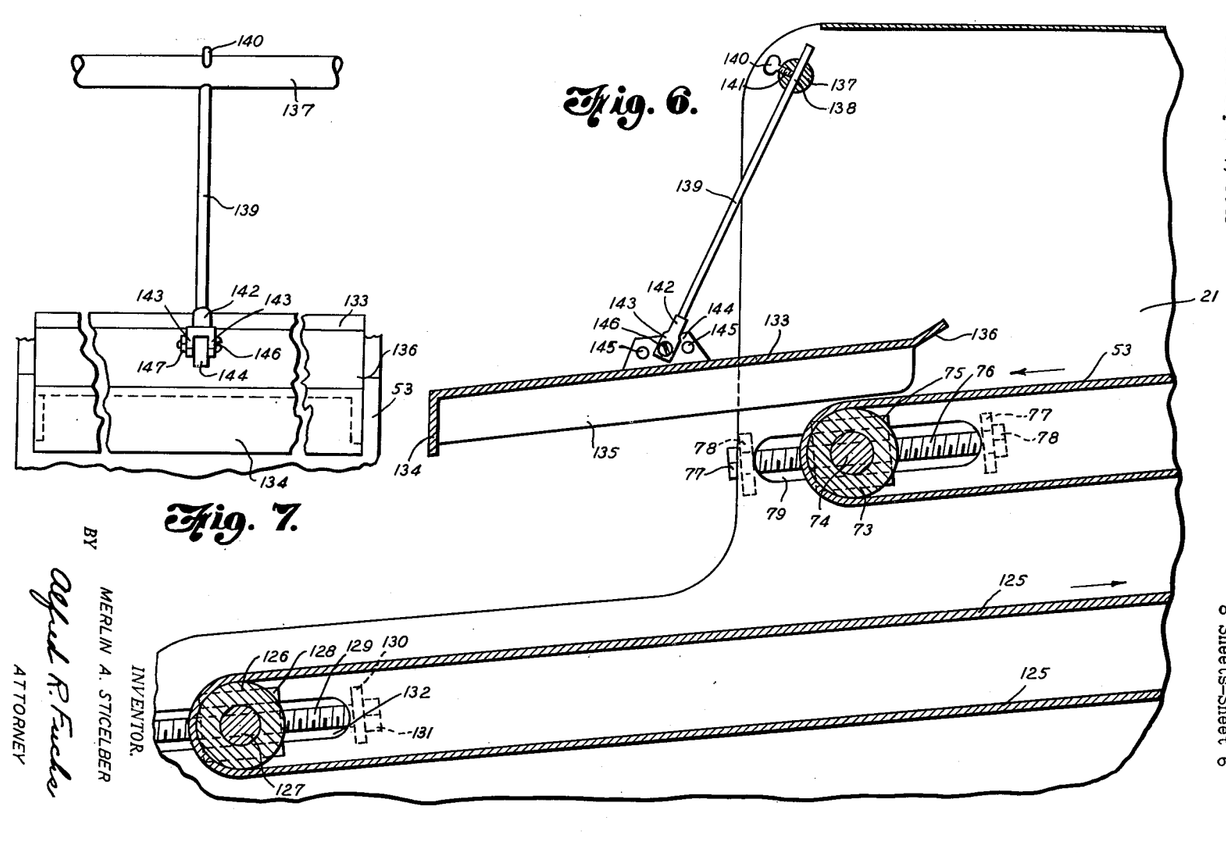
Fig. 6 is an enlarged fragmentary sectional view of the dough piece transfer means, showing the discharge end portion of the upper conveyor belt and the corresponding portion of the cooperating lower conveyor belt and the deflecting stop means for the dough pieces discharged from the upper conveyor belt.
Fig. 7 is an end elevation of the deflecting stop member and the mounting therefor, partly broken away, a fragmentary part of the conveyor belt being shown in elevation.

Dough deflecting guide plates 49 and 50 are provided adjacent the rollers 36 and 39, said guide plates having lips 51 and 52 thereon that are directed toward the surfaces of the rollers, but are spaced sufficiently therefrom that there will be no frictional contact between the said lips and surfaces of the rollers adjacent which the same are located, said deflector members 49 and 50 not serving the function of a scraper at all and having no scraping engagement with the rollers, but merely serving as deflecting or guiding means for the dough pieces to turn the dough pieces away from the surfaces of the rollers in case said dough pieces should have a tendency to follow the surfaces of the rollers 36 and 39 around beyond the point where said deflecting means are located. Said deflecting means will direct the dough pieces downwardly onto a conveyor belt 53, the upper run of which operates in the direction of the arrow shown in Figs. 1, 4 and 6. The deflecting guide plates 49 and 50 are mounted in slots 54 and 55 in the bars 56 and 57, which extend transversely of the machine. The bar 56 extends between the side plates 20 and 21 and is provided with screw-threaded openings 58 in the ends thereof engaged by the screw-threaded headed fastening elements 59 that extend through aligning openings in the side plates, the mounting of said bar 56 on the side plate 21 being shown in Fig. 10.

The roller 39 has its shaft 45 extending beyond the ends thereof and said shaft is mounted in adjustable bearing blocks 60, which are mounted in slots 61 in the side plates 20 and 21, and are guided by engagement with suitable angle members 62 extending lengthwise of said slots and fixed to the side walls 20 and 21. Flanges 63 are provided on the bearing blocks 60 which engage the inner faces of the walls 20 and 21 adjacent the slots 61. As all the bearing blocks for all the adjustable rollers in the machine are duplicates the same reference numerals are applied to all thereof. The rod-like member 57 is mounted in openings in ears 65 on one of the flanges 63 and held in fixed position, as will be described below.

The bearing blocks 60 are also provided with bosses 67 in which the ends of adjusting screws 68 and 68' are screw-threadedly engaged. Said adjusting screws 68 and 68' have flanges 69 thereon that engage bars 66 fixed to the side walls 20 and 21. The screw-threaded members 68 and 68' are of different lengths, the members 68' being shorter than the members 68 and being adjusted along with the members 68 in a manner to be described below. Said screws 68 have knurled heads or hand wheels 70 by means of which the same are rotated to adjust the position of the shaft 45 and thus of the roller 39 in a manner to be described below. It will be noted that the bar 57 is fixed to the ears 65 by means of set screws 160 (see Fig. 8). The guide plate 50 moves with the bearing blocks and thus the relationship of the guide member 50 to the roller 39 will be the same for any adjusted position of said roller.

The conveyor belt 53 extends over a roller 71 mounted on a shaft 72 and also operates over a roller 73, which is mounted on a shaft 74 that is mounted in suitable bearings in blocks 75 that have screw-threaded engagement with the screw-threaded members 76 that are rotatably mounted in ears 77 projecting from the side plates 20 and 21, said screw-threaded members having polygonal heads 78, by means of which the same can be rotated. It will be obvious that by rotating the members 76 in the ears 77 the blocks 75 will be moved lengthwise of the threaded members 76 to adjust the position of the shaft 74, the blocks 75 being held against rotation because they are in face to face engagement with the outer faces of the side walls 20 and 21. The tension of the belt 53 can thus be adjusted by rotating the members 76 by means of the polygonal heads 78 thereon. The side walls 20 and 21 are provided with slots 79 to permit adjustment of the shaft 74 and thus of the conveyor roller 73.

Figures 11, 12:
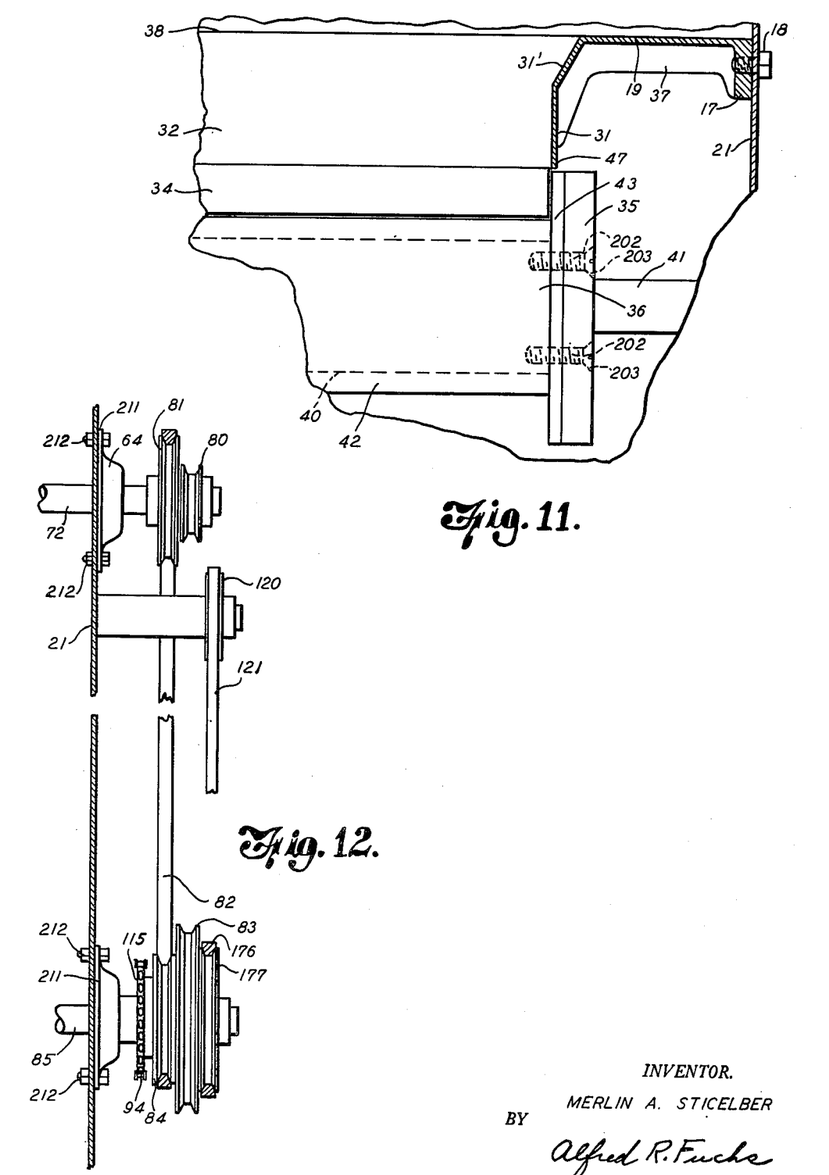
Fig. 11 is a fragmentary section taken on the line 11—11 of Fig. 4.
Fig. 12 is a fragmentary sectional view of the driving means, on an enlarged scale, taken on the line 12—12 of Fig. 2.

The shaft 72 is mounted in suitable bearings provided on the side plates 20 and 21, such as the bearing 64 shown on the side plate 21 in Fig. 12, and has a pair of pulleys 80 and 81 fixed on the end thereof that projects beyond the side plate 21. A belt 82 operates over the pulley 80 or 81, as the case may be, and over the corresponding pulley 83 or 84 fixed on the main drive shaft 85, being shown on the pulleys 81 and 84 in Figs. 2 and 12. Said main drive shaft has a pulley 86 fixed thereto over which a belt 87 operates, which belt 87 also extends over the pulley 88 on the motor shaft 89 of the motor 90, which is mounted on the inside of the housing, being fixed on the wall of the housing by means of fastening elements 91 mounted in the slots 92, which permits adjustment of the motor 90. The motor shaft 89 extends through an elongated arcuate slot 93 to permit adjustment of the position of the motor. The conveyor belt 53 can be operated at two different speeds by adjustment of the belt 82 to operate over either the pulleys 80 and 83 or the pulleys 81 and 84, as will be explained below and for the purpose to be explained below.

A sprocket 115 is also fixed on the shaft 85, over which the sprocket chain 94 operates, said sprocket chain also operating over a sprocket wheel 95 which is fixed on a shaft 96, which has a sprocket fixed thereto over which the sprocket chain 97 operates. Said sprocket chain 97 operates over the sprockets 98, 99 and 100. The shaft 85 and thus the pulley 84 and the sprockets mounted on the shaft 85 rotate in the direction indicated by the arrow in Fig. 2, which causes the sprockets 98 and 99 to rotate in the direction indicated by the arrows thereon in Fig. 2.

Figure 2:
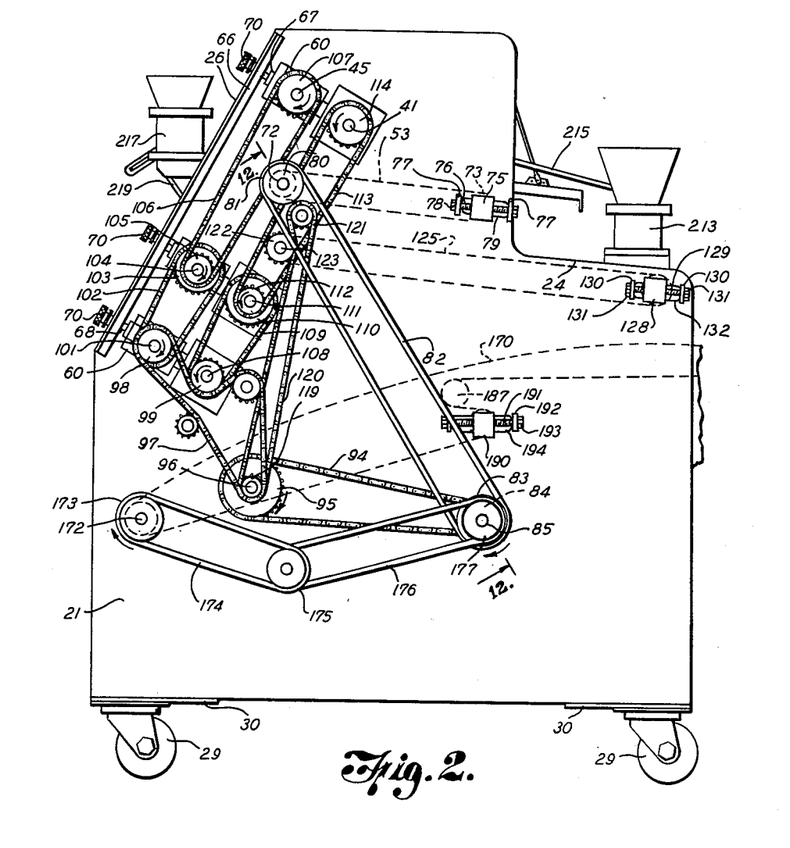
Fig. 2 is a side elevational view thereof, the discharge end of the delivery conveyor being omitted.
Figure 3:
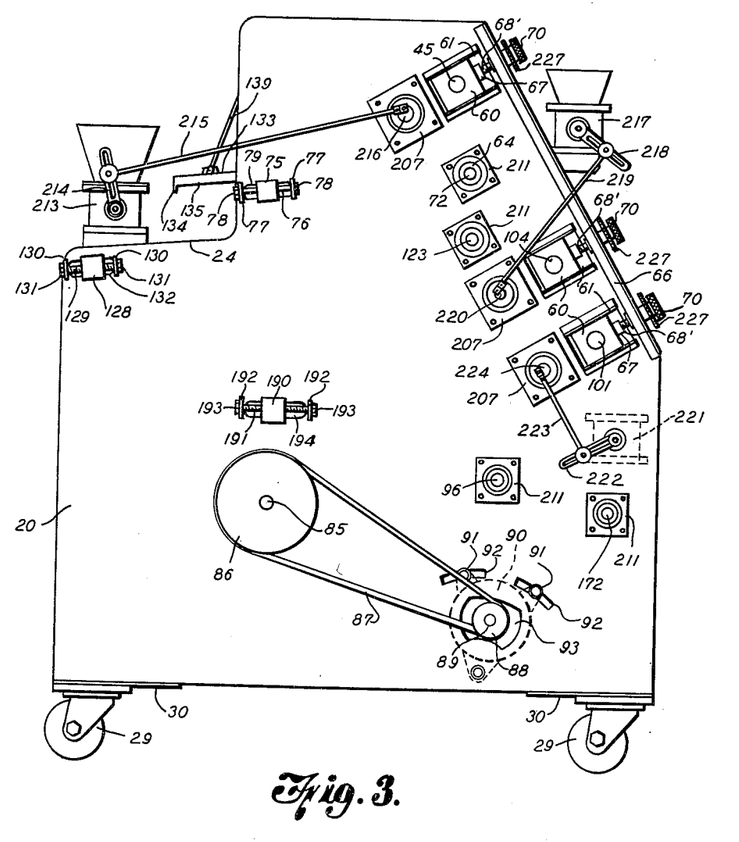
Fig. 3 is a similar view of the opposite side of the machine to that shown in Fig. 2.

The sprocket 98 is mounted on a shaft 101 that also has a sprocket mounted thereon to rotate therewith, over which the sprocket chain 102 operates, which operates over a sprocket 103 fixed on the shaft 104, which also has a sprocket 105 fixed thereon over which the sprocket chain 106 operates, the sprocket chain 106 operating over the sprocket 107, which is fixed on the shaft 45, the sprocket 107 and the sprocket 105 thus rotating in the direction indicated by the arrows, on said sprockets in Fig. 2. The sprocket 99 is fixed on a shaft 108 that also has a sprocket fixed thereto, over which the sprocket chain 109 operates, which in turn operates over a sprocket 110 fixed on the shaft 111, that also has the sprocket 112 fixed thereto, over which the sprocket chain 113 operates, the sprocket chain 113 operating over the sprocket wheel 114, which is fixed on the shaft 41, the sprockets 114 and 112 thus rotating in the direction indicated by the arrow on the sprocket 114 in Fig. 2. It will accordingly be seen that the shafts 45 and 41 rotate in opposite directions and thus the rollers 39 and 36 rotate in opposite directions, as indicated by the arrows thereon in Fig. 4, and it will further be noted that said rollers being of the same outside diameter and rotating at the same rate will rotate at the same surface speed.

Fixed on the shaft 96 is a sprocket 119. Since the sprocket wheel 95 rotates in the direction of the arrow indicated in Fig. 2, the sprocket chain 120, operating over the sprocket 119 and operating over the idler sprocket 121 and the sprocket 122, will rotate the sprocket 122 in a clockwise direction as viewed in Fig. 2, thus rotating the shaft 123 and the roller 124 fixed on said shaft in a clockwise direction as viewed in Fig. 1, the conveyor belt 125 operating over the roller 124 thus having the upper run thereof traveling in the direction indicated by the arrow in Figs. 1, 4 and 6. The conveyor belt 125 also operates over the roller 126, which is adjustably mounted so as to provide the proper tension on the conveyor belt 125 in a similar manner to the roller 73, the shaft 127 on which said roller 126 is mounted being mounted in bearing blocks 128 screw-threadedly connected with the members 129, which are rotatably mounted in ears 130 and have heads 131 thereon serving the same purpose as the screw-threaded members 76 mounted in the ears 77 with the heads 78 thereon above described. Slots 132 are provided in the side members 20 and 21 to permit adjustment of the shaft 127.

It will accordingly be seen that the upper run of the conveyor belt 125 travels in the opposite direction of the upper run of the conveyor belt 53. The sheeted dough pieces that pass from between the rollers 36 and 39 will travel along the upper run of the conveyor belt 53 toward the end thereof passing over the roller 73 and will be discharged from that end of the conveyor belt. When the belt 82 is mounted on the pulleys 83 and 89 the shaft 72 will travel at a much higher rate of speed than when the belt 82 is mounted on the pulleys 81 and 84 and said rate of rotation of the shaft 72 will be such that the conveyor belt 53 will travel substantially twice as fast as when the belt 82 is on the pulleys 81 and 84 and as a result the sheeted dough pieces will be projected at considerable momentum from the end of the conveyor having the conveyor belt 53 at which the roller 73 is located. By providing means for arresting the movement of the dough pieces so projected from the end of the conveyor that is provided with said conveyor belt 53, said dough pieces will be caused to drop substantially vertically downwardly onto the conveyor belt 125.

The means for stopping such dough pieces and deflecting the same downwardly onto the conveyor belt 125 in a substantially vertical direction comprises a deflector plate 133, which is provided with a depending flange 134 at one end thereof and side flanges 135, as well as an upwardly obliquely extending lip 136. Said deflector plate 133 is mounted so as to be adjustable relative to the conveyor belt 53 so that said deflector plate and its depending stop flange 134 will be properly located to transfer the sheeted dough pieces from the conveyor 53 downwardly to the conveyor 125 so that the end of the dough piece that was rearmost as it was traveling along the conveyor 53 becomes the forward edge of the dough piece as it travels along the conveyor belt 125.

The means for adjustably mounting the deflector plate 133 on the machine comprises a transversely extending bar or rod 137, which is mounted between the side walls 20 and 21 and which is provided with a transverse bore 138 therethrough, in which the rod-like plate supporting member 139 is longitudinally slidably mounted. Said rod-like member 139 is held in adjusted position by means of a thumb screw 140 engaging the same and having a screw-threaded portion 141 that engages in a screw-threaded bore in the rod-like member 137 extending transversely to the opening 138 and intersecting the same (see Figs. 6 and 7). Said rod-like member 139 has a bracket 142 fixed to the lower end thereof, which is provided with a pair of ears 143 that extend on opposite sides of an upstanding ear 144 provided on the deflector member 133. Said ear 144 is provided with a plurality of openings 145 spaced along the length thereof, the ear 144 extending lengthwise of the deflector plate 133. A screw-threaded headed member, such as the bolt 146, extends through aligned openings in the ears 143 and a selected one of said openings 145 and has a nut 147 provided thereon for clamping the ear 144 between the ears 143, said ears 143 having sufficient resiliency to permit this. It will be obvious that the elevation of the deflector plate 133, as well as its position lengthwise of the conveyor 53 and its angular position or inclination can be adjusted by the adjusting means provided by means of the connection between the rod-like member 137 and the rod-like member 139, as well as the connection between the ear 144 and the bracket 142.

Figure 1:
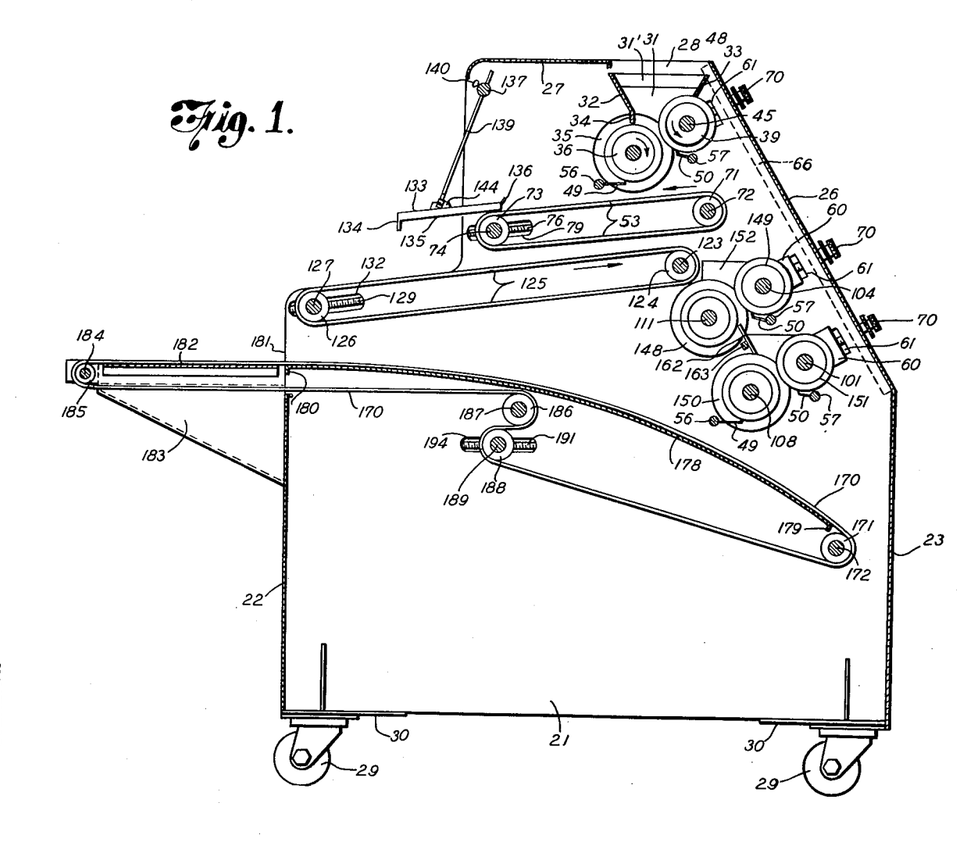
Fig. 1 is a vertical sectional view through my improved sheeting apparatus for dough molding machines, the dusting flour feeders being omitted.

The dough pieces that are traveling along on the conveyor belt 125 will travel with said conveyor belt toward the right as viewed in Fig. 1 and will pass off the conveyor belt 125 where it passes around the roller 124 to additional sheeting rollers, which are similar to the rollers 36 and 39, there being an upper and a lower pair of sheeting rollers provided, the upper pair of rollers comprising a flanged roller 148, which is constructed in the same manner as the roller 36, and an unflanged roller 149, which is constructed in the same manner as the roller 39, except that the roller 39, preferably, has the surface thereof provided with grooves 226 to provide means for gripping the rounded dough pieces to positively pull the same into cooperative relation with the rollers 36 and 39. The lower set of rollers comprises a flanged roller 150, also similar to the roller 36, and an unflanged roller 151, also similar to the roller 39. As the detailed construction of the rollers 148 and 150 is the same as the roller 36 and the detailed construction of the rollers 149 and 151 is the same as that of the roller 39, except that these do not have the grooves 226, the same reference numerals are applied to the corresponding parts of the rollers 36, 148 and 150, and the corresponding parts of the rollers 39, 149 and 151. The rollers 148, 149, 150 and 151 rotate in the direction indicated by the arrows provided thereon in Fig. 5.

Figure 5:
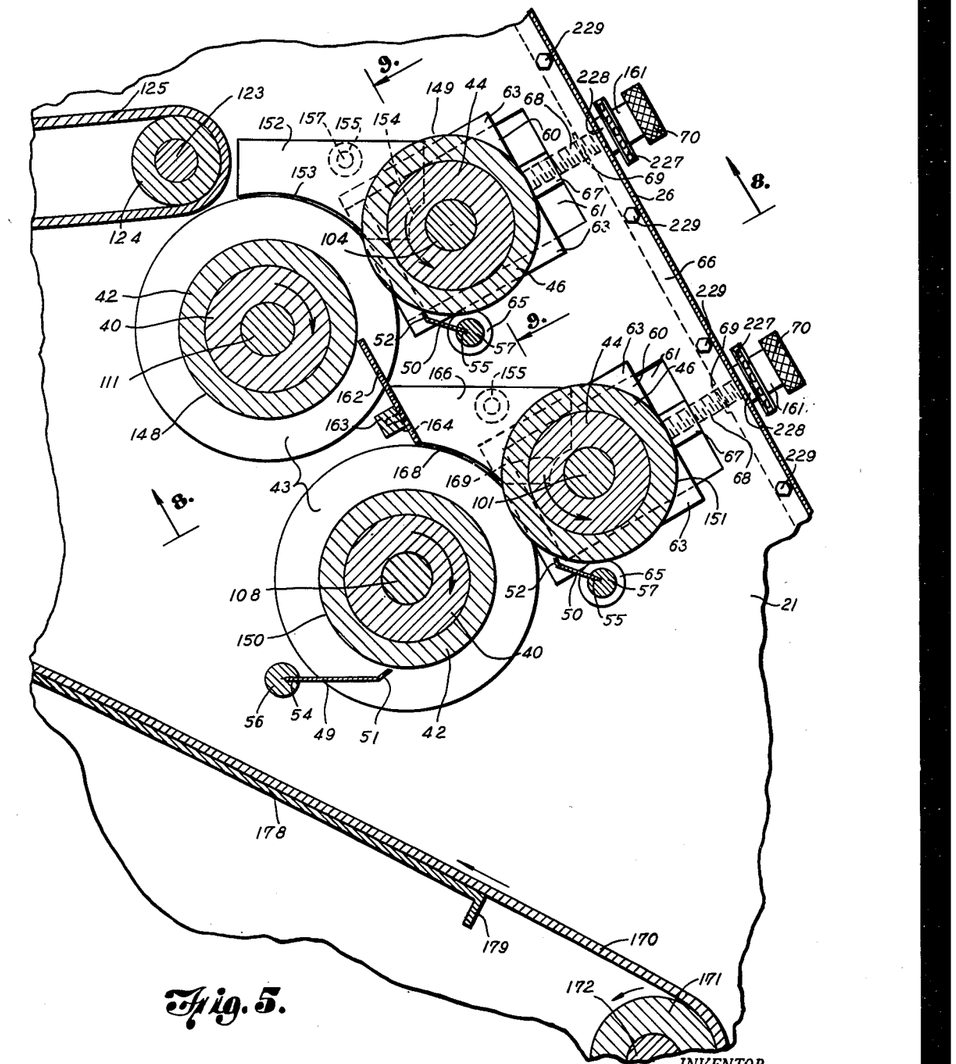
Fig. 5 is a similar view of the lower pairs of sheeting rollers and conveying means cooperating therewith.
Figure 9:
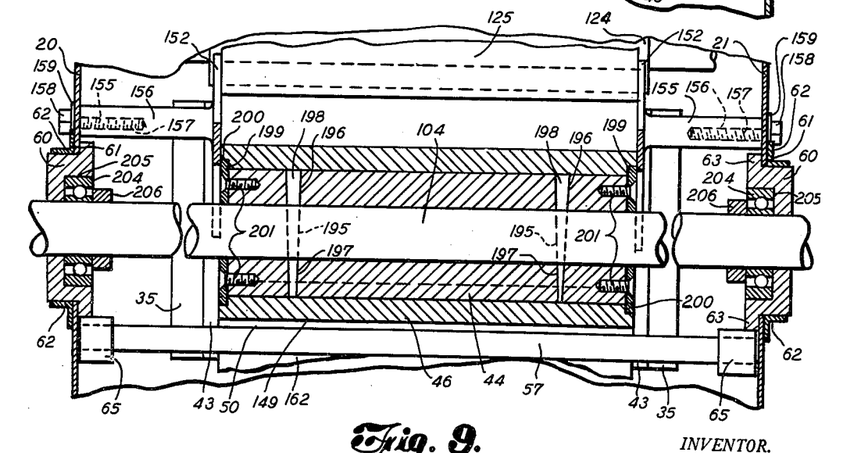
Fig. 9 is a section taken on the line 9—9 of Fig. 5, partly broken away.

In order to direct the sheeted pieces of dough traveling along the conveyor belt 125 and discharged therefrom properly into cooperative relation with the upper pair of sheeting rollers 148 and 149, guiding means are provided, comprising guide plates 152, which are shown more in detail in Figs. 5 and 9, said guide plates being substantially in alignment with the linings 43 of the flanges on the roller 148, as will be obvious from Fig. 9, and each having a concavely curved edge portion 153 spaced slightly from the peripheral edges of the flanges provided on the roller 148. Said guide plates 152 are also provided with curved cut out portions 154 to accommodate the shaft 104 in case the adjustment of the roller 149 should make this necessary. Said guide plates are provided with post-like members 155 projecting therefrom toward the side plates 20 and 21 and said post-like members are provided with internally threaded openings 156, with which the headed screw-threaded members 157 engage to clamp said post-like members to the side plates 20 and 21, said headed members having heads 158 lying on the outside of said side plates, and washers 159 may be provided between said heads and said side plates. The guide plates 152 are thus located in fixed position relative to the side plates and to the rollers 148.

Figure 8:
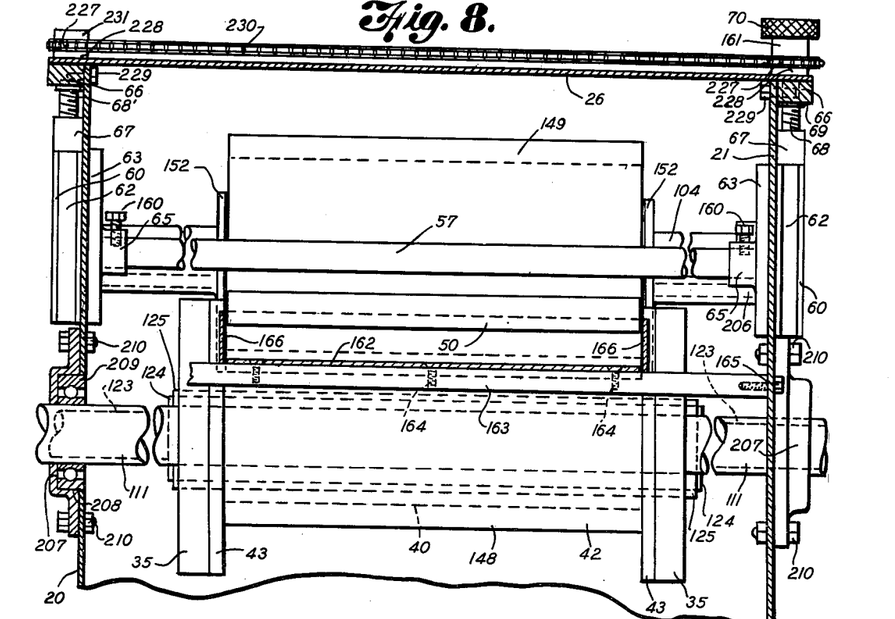
Fig. 8 is a section taken on the line 8—8 of Fig. 5, partly broken away.

The rollers 149 and 151 are mounted adjustably in the same manner as the roller 39 and the details of construction of said mounting are shown most clearly in Figs. 5, 8 and 9. The mounting for the shaft 104 shown in Figs. 8 and 9 is the same as the mounting for the shaft 45 shown in Fig. 4 and the same reference numerals are applied to the slidable bearing blocks and their adjustable mountings in Figs. 5, 8 and 9 as in Fig. 4. The knurled heads 70 or hand wheels, as the case may be, have reduced hub portions 161 thereon that are fixed to the members 68 and sprocket wheels 227 are fixed on the members 68 to rotate therewith, having hub portions 228 thereon that engage the wall 26 where the same overlaps the bars 66, said bars being fixed in position on the side plates 20 and 21 by means of suitable headed fastening elements 229. The members 68' are also provided with the sprockets 227 fixed thereto and a sprocket chain 230 operates over the sprockets 227 on the members 68 and 68' that are associated with a pair of the sliding blocks 60 carrying the shaft for any one of the adjustable rollers, such as the shaft 104. A collar 231 is fixed on each of the members 68' to hold the sprocket 227 in position. It will be obvious that due to engagement of the hub portions 228 on any one of the members 68 or 68' associated with one of the adjustable rollers with the wall 26 and the engagement of the enlargements 69 on said members 68 and 63' with the bar 66 the members 68 and 68' will be held against axial movement. Rotation of the hand wheel or head 70 on the member 68 will cause rotation of the adjusting member 68 and through the sprocket chain 230 cause rotation of the adjusting member 68'. As both of said adjusting members are held against axial movement relative to the frame of the machine the threaded engagement between said members 68 and 68' and the internally screw-threaded openings in the bosses 67 will adjust the position of the rollers 39, 149 and 151, as the case may be.

The dough pieces will be guided into position between the rollers 148 and 149 by means of the guide plates 152 and will be sheeted by the cooperative action of said rollers and will then pass toward the rollers 150 and 151, this being accomplished by means of the guide member 50, which is the same as the guide member previously described in connection with the roller 39, and is mounted in the same manner and is similarly spaced at its inturned end 52 from the surface of the roller 149.

Cooperating with the guide member 50 to guide the sheeted dough pieces into cooperative engagement with the rollers 150 and 151 is a guide 162, which is mounted on a rod-like member 163 that is square in cross section, being fixed thereto by suitable headed securing elements 164; said rod-like member 163 having screw-threaded openings in the ends thereof which the headed screw-threaded elements 165 engage to secure the rod-like member to the side plates 20 and 21. A pair of guide plates 166 is also provided, which are similar to the guide plates 152 but slightly different in shape. These are mounted in the same manner as the plates 152 on the side plates by means of the post-like members 155, the guide plate 162 fitting between the guide plates 166, and said guide plates 166 having curved cut-out edges 168 lying closely adjacent the curved peripheries of the flanges of the roller 150 and having a curved cut-out portion 169 to accommodate the shaft 101 in case the adjustment of the roller 151 should make this necessary.

Guide members 49 and 50 are provided on the discharge side of the cooperating rollers 150 and 151, which are exactly the same in construction as the guide members 49 and 50 described in connection with the rollers 36 and 39 and are mounted in the same way on the side plates 20 and 21 and on the adjustable bearing blocks 60. The inturned flanges or end portions 51 and 52 on the guide members 49 and 50 are spaced from the surfaces of the rollers 150 and 151 so as to be near thereto, but out of frictional contact therewith, none of the guide members 49, 50 or 162 engaging the rollers thus preventing any scraping action of said guide members and any frictional contact with said rollers, which might cause heating of the same.

Mounted below the lower pair of sheeting rollers 150 and 151 is a conveyor belt 170, which operates over the roller 171 fixed on the shaft 172. Said shaft 172 has a pulley 173 fixed thereto over which the belt 174 operates, said belt 174 also operating over a variable speed pulley device 175, which is driven by means of the belt 176 operating over a pulley 177 fixed on the main drive shaft 85 (see Figs. 2 and 12). The pulley 173 will be rotated in the direction indicated by the arrow in Fig. 2, and accordingly the roller 171 will rotate in a counter-clockwise direction as viewed in Figs. 1 and 5 and the conveyor belt 170 will travel in the direction indicated by the arrow in Fig. 5.

The conveyor belt 170 operates over a curved guide plate 178, which is provided with a depending lip 179 adjacent the roller 171 and which extends substantially to the end wall 22, being provided with a lip or flange 180 at the extremity thereof adjacent said end wall 22. The housing is provided with an opening 181 therein through which the conveyor belt 178 extends, said conveyor belt extending across a table 182 projecting from the housing of the machine and mounted on brackets 183 extending from said housing. Also mounted on the brackets 183 is a shaft 184, which is freely rotatable in suitable bearings on said brackets, and has the roller 185 mounted thereon over which said conveyor belt 170 operates. Said conveyor belt 170 thus delivers the sheeted dough pieces from the dough sheeting apparatus to suitable curling mechanism, which may be placed in cooperative relation to the belt 170, or mounted in cooperative relation to a panning conveyor belt, as is customary.

Suitable means is provided for tensioning the conveyor belt 170 comprising a roller 186 mounted on a shaft 187, which is mounted in suitable bearings provided on the side plates 20 and 21 of the housing, and an adjustable roller 188 mounted on the shaft 189, said shaft 189 being adjustable in a similar manner to the shafts 74 and 127 by means of the screw-threaded connection between the bearing blocks 190 and screw-threaded members 191, which are mounted in a similar manner to the screw-threaded member 76 in suitable ears 192 on the side plates 20 and 21 and have heads 193 thereon by means of which said screw-threaded members can be rotated, slots 194 being provided in the side plates to permit adjustment of the bearing blocks and thus the shafts 189 to tension the belt 170.

The means for holding the adjustable rollers in fixed position on the shafts on which the same are mounted is shown in Fig. 9, the shaft 104 being shown as being provided with tapering openings 195 therein that align with tapering openings 196 and 197 in the metallic body portion 44 of the roller and tapering pins 198 are driven in said aligning tapering openings to fix the body portion 44 to the shaft. The outer sleeve-like synthetic resin member 46 is fixed to the body portion 44 to rotate therewith by means of clamping rings 199 that seat in recesses 200 in the ends of the tubular member 46 and which are held in clamping engagement therewith by means of the screw-threaded fastening elements 201 that engage in screw-threaded openings in the end walls of the body portion 44.

In a similar manner, shown in Fig. 11, the ring-like member 35, which is a flange forming member, holds the inner facing 43 of said synthetic resin on said flange in clamping engagement with the body portion 40 of the flanged roller, the body portion 40 being secured to the shaft on which it is mounted in the same way as the body portion 44. A sleeve-like member 42 of synthetic resin is clamped between the facings 43 by means of the rings 35, secured in clamping position by means of the threaded headed securing elements 202, which are provided with heads 203 that are countersunk in the outer faces of the members 35, and which have screw-threaded engagement with screw-threaded openings in the body portion 40 of the roller. This structure is utilized in each of the rollers 36, 148 and 150 for causing the rollers, including their synthetic resin facings, to rotate as a unit with the shafts upon which the same are mounted.

The shafts on which the adjustable rollers are mounted are all mounted in the same manner in the bearing blocks 60, said bearing blocks being provided with ball bearings 204, which are mounted in suitable recesses 205 in said bearing blocks 60, as shown in Fig. 9, and said shafts are held from endwise movement in their bearings by means of the collars 206, which are fixed on said shafts in any suitable manner. The shafts of the flanged rollers are all mounted in the same manner on the side plates 20 and 21, the ball bearing mounting members 207 being provided that have recesses 208 therein, in which the ball bearings 209 are mounted, as shown in Fig. 8. Said mounting members 207 are secured to the side plates 20 and 21 by means of suitable headed screw-threaded fastening elements 210. The shafts 72, 96, 123 and 172 are provided with similar ball bearings mounted in suitable ball bearing mounting members 211, as is also the shaft 85, said ball bearing mounting members 211 being secured to the side plates in a similar manner to the mounting members 207, as shown in Fig. 12, headed screw-threaded securing elements 212 being shown in Fig. 12 for securing said ball bearing mounting members in position.

While dusting flour can be dispensed with in my improved sheeting apparatus, it may be found desirable by some bakers to apply dusting flour to the conveyor belts, and for this purpose a dusting flour feeder 213 is provided, which is operated by means of an oscillating lever 214 that is adjustably connected with an operating rod 215 that is connected with an eccentric 216 mounted on the shaft 41, the adjustment of the connection between the oscillating lever 214 and the rod 215 determining the amount of dusting flour supplied to the conveyor belt 125. A similar dusting flour feeding member 217 may be provided for feeding dusting flour to the paired rollers 148 and 149 and thus to the rollers 150 and 151, an oscillating arm 218 on the feeding member 217 being adjustably connected with the rod 219 that is connected with an eccentric 220 mounted on the shaft 111. Means may also be provided for feeding dusting flour to the conveyor belt 170, comprising a feeding member 221, which is similarly actuated by means of the oscillating lever 222 adjustably connected with the rod 223, which is in turn connected with the eccentric 224 mounted on the shaft 108.

The synthetic resin that is employed in the tubular members 42 and 46 and the disk-like facings 43 is a synthetic resin that has the characteristic that dough will not stick thereto, and is rigid and unyielding, the particular material that has been found most adaptable being a polytetraflouroethylene polymer, such as described in the patent to Plunkett, 2,230,654, patented February 4, 1941. It has also been found that another synthetic resin, polyethylene, such as described in the patent to Fawcett, 2,153,553, patented April 11, 1939, can be used, as it has similar properties at room temperatures.

In operation the rounded pieces of dough are fed through the openings 28 into the hopper 38 and pass between the rollers 36 and 39 to be sheeted. The guide members 49 and 50 direct said sheeted pieces of dough onto the conveyor belt 53 and said sheeted pieces of dough pass along said conveyor belt toward the roller 73, being discharged from said conveyor at the end thereof provided with said roller 73. If the belt 53 is operating at high speed, which is the case when the belt 82 is mounted on the pulleys 83 and 80, then the sheeted dough pieces will be discharged from the conveyor belt 53 against the flange 134 of the deflector plate 133, which has been previously adjusted so as to be in proper position for such engagement of said dough pieces with said flange 134. As a result the dough pieces will drop substantially vertically downwardly onto the conveyor belt 125 and the end that was forwardmost when traveling along the conveyor belt 53 will be rearmost when traveling along the conveyor belt 125. The dough pieces traveling along the conveyor belt 125 are discharged into the space between the guide plates 152 and into engagement with the sheeting rollers 148 and 149 and travel downwardly between said rollers and toward the rollers 150 and 151, being guided into engagement with the rollers 150 and 151 by means of the guide plate 162 and the guide member 50. The dough pieces that pass from the sheeting rollers 150 and 151 to the conveyor belt 170 are guided into engagement with said conveyor belt by means of the guide members 49 and 50. The end of the dough piece that was forwardmost on the conveyor belt 125 will still be forwardmost on the conveyor belt 170 and will pass out of the machine and onto a table 182 on said conveyor belt 170, from which it is transferred to suitable curling mechanism, if such is not provided on the table 182.

The above described operation of the machine will result in the reverse sheeting of the dough pieces or sheeting of the dough pieces in a reverse direction by the rollers 148 and 149 and the rollers 150 and 151 to that in which the same were sheeted by the rollers 36 and 39. However, if the belt 82 is adjusted to operate over the pulleys 81 and 84, then the conveyor belt 53 will travel at a speed approximately half that at which it traveled while the belt 82 was on the pulleys 80 and 83. As a result the sheeted pieces of dough, when reaching the position where the belt 53 passes around the roller 73, will follow the curvature of the belt around the roller and will pass with the forwardmost end thereof first into engagement with the conveyor belt 125 and the end of the sheeted dough piece that was forwardmost on the belt 53 will remain forwardmost on the belt 125 as each dough piece travels along with the conveyor belt 125 to where the same passes over the roller 124 and into engagement with the rollers 148 and 149 and into engagement with the rollers 150 and 151 and finally into engagement with the conveyor belt 170 in a similar manner to that previously described. This will result in sheeting by the rollers 36 and 39, and 148 and 149, and 150 and 151 all in the same direction, or what is ordinarily referred to as straight sheeting. Thus by merely shifting the belt 82 the machine can be changed from straight sheeting to reverse sheeting operation, and vice versa.

What I claim is:

1. In a mechanism for reversing sheeted dough pieces of substantially uniform length end for end relative to their direction of travel, a pair of superposed conveyors operating in opposite directions, the discharge end of the upper of said conveyors being located over and at a point spaced from the corresponding end of the lower of said conveyors, means for operating said upper conveyor at a speed to project sheeted dough pieces endwise therefrom, and dough piece deflecting means extending over the dough pieces projected from said upper conveyor and comprising arresting means spaced endwise of and beyond said end of said upper conveyor a distance greater than the length of said dough pieces and transversing the path of said projected dough pieces, whereby said dough pieces, upon engagement with said arresting means and clearance of said upper conveyor, are deposited directly on said lower conveyor same side up as on said upper conveyor.

2. In a mechanism for reversing sheeted dough pieces of substantially uniform length end for end relative to their direction of travel, a pair of superposed conveyors operating in opposite directions, the discharge end of the upper of said conveyors being located over and at a point spaced from the corresponding end of the lower of said conveyors, means for operating said upper conveyor at a speed to project sheeted dough pieces endwise therefrom, and a deflector plate above and overlapping the discharge end of said upper conveyor and extending therebeyond having depending arresting means thereon spaced endwise of and beyond said end of said upper conveyor a distance greater than the length of said dough pieces, whereby said dough pieces, upon engagement with said arresting means and clearance of said upper conveyor, are deposited directly on said lower conveyor same side up as on said upper conveyor.

3. In a mechanism for reversing sheeted dough pieces of substantially uniform length end for end relative to their direction of travel, a pair of superposed conveyors operating in opposite directions, the discharge end of the upper of said conveyors being located over and at a point spaced from the corresponding end of the lower of said conveyors, means for operating said upper conveyor at a speed to project sheeted dough pieces endwise therefrom, and a deflector plate above and overlapping the discharge end of said upper conveyor and extending therebeyond having a stop flange depending therefrom spaced endwise of and beyond said end of said upper conveyor a distance greater than the length of said dough pieces, whereby said dough pieces, upon engagement with said stop flange and clearance of said upper conveyor, are deposited directly on said lower conveyor same side up as on said upper conveyor.

4. In a mechanism for reversing sheeted dough pieces of substantially uniform length end for end relative to their direction of travel, a pair of superposed conveyors operating in opposite directions, the discharge end of the upper of said conveyors being located over and at a point spaced from the corresponding end of the lower of said conveyors, means for operating said upper conveyor at a speed to project sheeted dough pieces endwise therefrom, and dough piece deflecting means extending over the dough pieces projected from said upper conveyor and mounted for adjustment relative to said upper conveyor, said deflecting means comprising arresting means spaced endwise of and beyond said end of said upper conveyor a distance greater than the length of said dough pieces and transversing the path of said projected dough pieces, whereby said dough pieces, upon engagement with said arresting means and clearance of said upper conveyor, are deposited directly on said lower conveyor same side up as on said upper conveyor.

5. In a mechanism for reversing sheeted dough pieces of substantially uniform length end for end relative to their direction of travel, a pair of superposed conveyors operating in opposite directions, the discharge end of the upper of said conveyors being located over and at a point spaced from the corresponding end of the lower of said conveyors, means for operating said upper conveyor at a speed to project sheeted dough pieces endwise therefrom, and dough piece deflecting means mounted over and extending endwise beyond said upper conveyor, means for adjusting the extent of said deflecting means beyond and spacing above said upper conveyor, said deflecting means comprising arresting means spaced endwise of and beyond said end of said upper conveyor a distance greater than the length of said dough pieces and transversing the path of said projected dough pieces, whereby said dough pieces, upon engagement with said arresting means and clearance of said upper conveyor, are deposited directly on said lower conveyor same side up as on said upper conveyor.

6. In a mechanism for reversing sheeted dough pieces of substantially uniform length end for end relative to their direction of travel, a pair of superposed conveyors operating in opposite directions, the discharge end of the upper of said conveyors being located over and at a point spaced from the corresponding end of the lower of said conveyors, means for operating said upper conveyor at a speed to project sheeted dough pieces endwise therefrom, and a deflector plate above and overlapping the discharge end of said upper conveyor and extending therebeyond mounted for adjustment relative to said upper conveyor having depending arresting means thereon spaced endwise of and beyond said end of said upper conveyor a distance greater than the length of said dough pieces, whereby said dough pieces, upon engagement with said arresting means and clearance of said upper conveyor, are deposited directly on said lower conveyor same side up as on said upper conveyor.

7. In a mechanism for reversing sheeted dough pieces of substantially uniform length end for end relative to their direction of travel, a pair of superposed conveyors operating in opposite directions, the discharge end of the upper of said conveyors being located over and at a point spaced from the corresponding end of the lower of said conveyors, means for operating said upper conveyor at a speed to project sheeted dough pieces endwise therefrom, and a deflector plate spaced above and overlapping the discharge end of said upper conveyor and extending therebeyond having a stop flange depending therefrom, said deflector plate being mounted for adjustment lengthwise, vertically and angularly relative to said upper conveyor, said stop flange being spaced endwise of and beyond said end of said upper conveyor a distance greater than the length of said dough pieces, whereby said dough pieces, upon engagement with said stop flange and clearance of said upper conveyor, are deposited directly on said lower conveyor same side up as on said upper conveyor.

8. In a mechanism for transferring sheeted dough pieces of substantially uniform length, a pair of superposed conveyors operating in opposite directions, the discharge end of the upper of said conveyors being located over and at a point spaced from the corresponding end of the lower of said conveyors, means for operating said upper conveyor at two different speeds and a deflector plate spaced above and overlapping the discharge end of said upper conveyor and extending therebeyond having a stop flange depending therefrom spaced endwise of and beyond said end of said upper conveyor a distance greater than the length of said dough pieces.

9. In a mechanism for reversing sheeted dough pieces of substantially uniform length end for end relative to their direction of travel, a belt conveyor for sheeted dough pieces, a second belt conveyor below said first belt conveyor and operating in the opposite direction, means for operating said first conveyor at a speed to project sheeted dough pieces endwise therebeyond at the discharge end thereof, the receiving end of said second conveyor extending endwise beyond the discharge end of said first conveyor, and a plate-like member at a higher level than said first conveyor having depending side flanges and a depending transverse flange against which said dough pieces are projected by said first conveyor to arrest movement thereof beyond the discharge end of said first conveyor and cause said dough pieces to drop onto said second conveyor same side up as on said first conveyor.

10. Means for reversing a sheeted dough piece end for end relative to its direction of travel, comprising an upper belt conveyor, means for operating said conveyor at a speed to project sheeted dough pieces endwise beyond the discharge end thereof, a lower belt conveyor operating in the opposite direction to said upper belt conveyor and extending beyond said discharge end, stop means engaged by said projected dough pieces to halt projection thereof, and deflecting means positioned to limit upward movement of said projected dough pieces, said stop means and said deflecting means being above the extending portion of said lower belt conveyor.

11. Means for reversing a sheeted dough piece end for end relative to its direction of travel, comprising an upper belt conveyor, means for operating said conveyor at a speed to project sheeted dough pieces endwise beyond the discharge end thereof, a lower belt conveyor operating in the opposite direction to said upper belt conveyor and extending beyond said discharge end, stop means engaged by said projected dough pieces to halt projection thereof, and deflecting means positioned to limit upward movement of said projected dough pieces, said stop means and said deflecting means being above the extending portion of said lower belt conveyor, the space between said stop means and the discharge end of said upper conveyor belt below said deflecting means being clear of all obstructions from said deflecting means to the top surface of said lower conveyor belt.

MERLIN A. STICELBER.

REFERENCES CITED

The following references are of record in the file of this patent:

UNITED STATES PATENTS

| Number | Name | Date |
|---|---|---|
| 534,071 | Mitchell | Feb. 12, 1895 |
| 806,869 | Burns | Dec. 12, 1905 |
| 1,541,651 | Mattack | June 9, 1925 |
| 1,657,018 | Larraburu | Jan. 24, 1928 |
| 1,794,896 | Hauck | Mar. 3, 1931 |
| 1,829,322 | Williams | Oct. 27, 1931 |
| 1,856,085 | Walters | May 3, 1932 |
| 1,895,634 | Lauterbur et al. | Jan. 31, 1933 |
| 1,931,614 | Kirchhoff | Oct. 24, 1933 |
| 2,090,598 | Parsons | Aug. 17, 1937 |
| 2,125,859 | Liebelt | Aug. 2, 1938 |
| 2,168,419 | Paterson | Aug. 8, 1939 |
| 2,275,714 | Anetsberger et al. | Mar. 10, 1942 |
| 2,373,012 | Burdett et al. | Apr. 3, 1945 |
| 2,425,356 | Sticelber | Aug. 12, 1947 |
| 2,479,864 | Rhodes | Aug. 23, 1949 |
| 2,541,752 | Eddy | Feb. 13, 1951 |

FOREIGN PATENTS

| Number | Country | Date |
|---|---|---|
| 469,873 | Great Britain | Aug. 4, 1937 |